Feb. 18, 1958 E. R. NEEDHAM ET AL 2,823,576
METHOD OF MAKING SLIP-FREE FISH NETTING
Filed March 2, 1953 2 Sheets-Sheet 1

Inventors
Edward R. Needham
Roland Johnson
By Alan Swabey
Attorney

Feb. 18, 1958 E. R. NEEDHAM ET AL 2,823,576
METHOD OF MAKING SLIP-FREE FISH NETTING
Filed March 2, 1953 2 Sheets-Sheet 2

Inventors
Edward R. Needham
Roland Johnson
By Alan Awabey
Attorney

United States Patent Office 2,823,576
Patented Feb. 18, 1958

2,823,576

METHOD OF MAKING SLIP-FREE FISH NETTING

Edward R. Needham and Roland Johnson, Drummondville, Quebec, Canada, assignors to Drummondville Cotton Company Limited, Montreal, Quebec, Canada, a corporation of Canada Application March 2, 1953, Serial No. 339,680

2 Claims. (Cl. 87—1)

This invention relates to the manufacture of fish netting and of twine for making fish netting.

More particularly, it relates to setting the netting to prevent "slip-mesh." This is a problem encountered especially in making fish netting from yarns of synthetic resin filaments, particularly linear polymers, for example nylon.

The problem of "slip-mesh" is one which has been plaguing the manufacturers of netting from certain synthetic resin filaments.

One method which has been satisfactory in overcoming this problem is by modifying the elastic memory of the twine material by subjecting the netting to wet heat followed by dry heat while keeping it under tension from the time it is knotted as described in Patent 2,653,372.

Coating processes have also been suggested for various types of textile fabrics in which a thick solution of a resinous material has been applied to the twine and appears on its surface as a perceptible coating. With netting, this has the disadvantage of changing its hand and increasing its weight.

APPLICANTS' DEVELOPMENT

The applicants have now been able to overcome the problem of "slip-mesh" and the disadvantages of prior art methods of attempting to do so.

This is done, according to the invention, by impregnating the twine of the netting with a thin alcohol-soluble synthetic resin which is effective to form a skeleton structure within the twine, and thus to keep it in the same shape it is at the time the resin sets. The resulting netting has a uniform resin content within the low range from about one tenth of one percent to about one and one-half percent by weight of the twine material. The resin is impregnated within the twine and is insufficient to give the netting a perceptible coating or modify its "hand," but is effective to subdue the elastic memory of the twine material to prevent the knots from slipping. Preferred results are achieved by impregnating the netting after it is formed, but while the knots are still held tight. But, the invention can also be applied with good results to twine and to nets which need patching.

According to the invention, fish netting is made as follows. In the knotting step, in a method involving simultaneous knotting and setting steps continuously performed on successive portions of a length of the netting, while the entire length is kept under tension effective to retain the knots tight and while the netting is advanced at normal knotting speed the netting is knotted on a netting machine from a twine made up of continuous filaments of a synthetic fiber, preferably made from a linear condensation polymer, so that evenly spaced apart knots (preferably single weaver's knots) are intervened by precise lengths of twine. The netting is advanced through the machine during its formation under tension effective to maintain the knots tight. This tension is preferably not greater than ten percent of the breaking strength of the twine. Then the netting is advanced from the machine while still under tension through an impregnating bath containing a solution of a water insoluble synthetic resin at a concentration sufficient to impregnate small amounts, preferably from about one tenth of one percent to one and one-half percent by weight of the resin in the twine. A preferred solution is an alcohol solution containing an amount preferably from about .5% to about 3% of an alcohol-soluble synthetic resin. The netting is moved from the impregnating bath while still kept under tension and the solvent removed. The temperature of the solution and drying is preferably warm, but preferably not high enough to alter the mesh size of the netting by heat modification of the twine material. This leaves the resin impregnated in the twine of the netting so that when the tension is relaxed the form of the knots is permanently retained.

It is believed that the synthetic resin forms within the twine and about the knots a skeleton structure which is elastic in nature and which tends to come back to its original form. The tendency of this structure to return to its original form is greater than that of the twine to loosen the knots.

This process can conveniently be carried out on an apparatus having the following features. It includes a bath for containing a treating solution. Means are provided for conveying the netting under tensions from the netting machine through the bath, then through a solvent removal zone while still under tension and thence to storage.

The invention will be understood more completely by reference to the accompanying drawings which illustrate a preferred form of netting made according to the present invention and a convenient form of apparatus in which the invention may be carried out, and in which.

Figure 1:
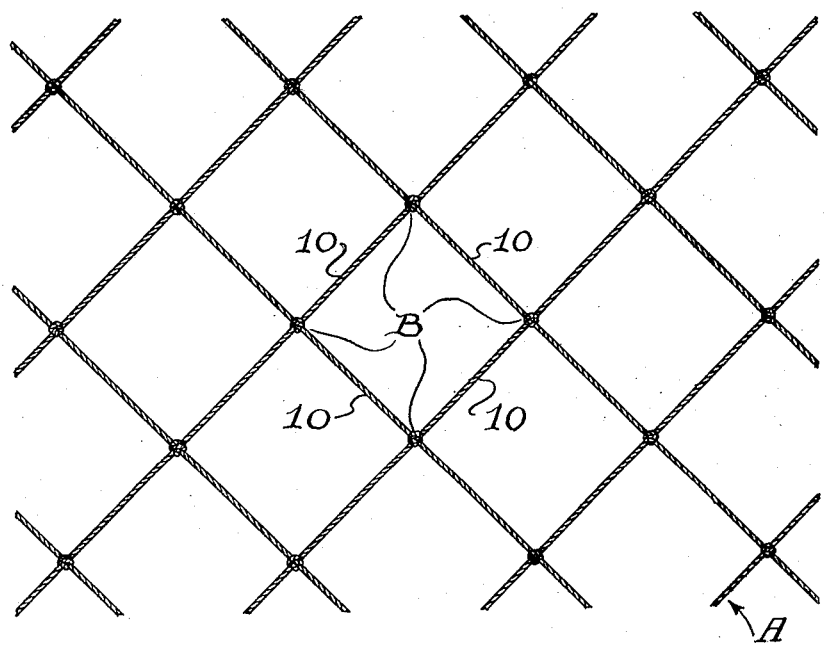
Figure 1 is a diagrammatic representation of a piece of fish netting according to the invention.
Figure 2:
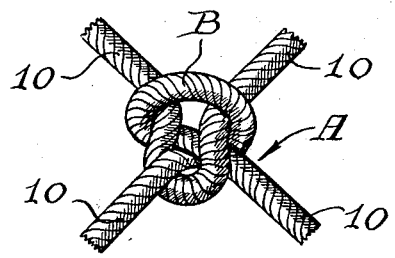
Figure 2 is an enlarged view of a portion of the netting shown in Figure 1, illustrating particularly regions including knots.

Referring more particularly to the drawings, the netting treated according to the invention is illustrated diagrammatically in Figures 1 and 2. The netting is generally designated as A. The knots are shown as B. The knots are intervened by substantially precise and even lengths of twine 10. The netting, including the knots, is impregnated and the material of the netting imperceptibly coated with alcohol-soluble nylon deposit from a solution. The deposit is so thin as to be substantially imperceptible.

Figure 3:
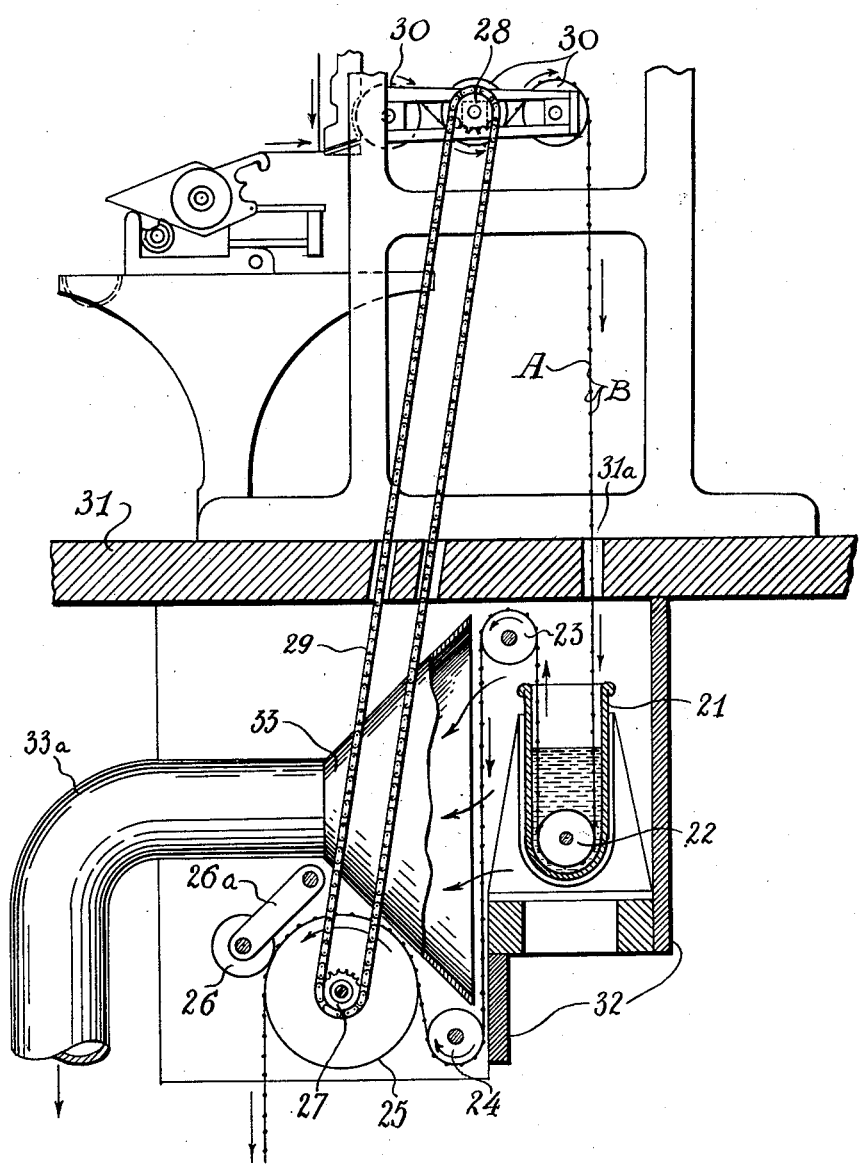
Figure 3 is a side elevation partly in vertical cross section through an apparatus in which netting is being treated according to the invention.

In the setting step, the impregnating agent is applied preferably by passing the netting through an apparatus such as that shown in Figure 3. In this apparatus 21 is a tank containing the treating solution. The numeral 22 identifies a roller in the tank about which the netting passes. The numeral 24 denotes a roller below the tank about which the netting passes on its way from the tank. The numeral 25 represents a larger roller whose function is to hold the netting and pull it through the tank. The roller 26 is mounted on pivoted arms 26a. The roller 26 presses the netting against the roller 25. The numeral 27 indicates a sprocket or chain wheel mounted on a shaft extending axially from the roller 25. The wheel 27 is driven by a chain 29 from a sprocket 28 which is mounted on the mesh size rollers 30 forming an integral part of the net-making machine. The numeral 33 denotes a fume hood connected to a suction fan to draw off solvent fumes. The fume hood 33 is connected by a conduit 33a with a solvent recovery apparatus. Panelling 32 encloses the installation.

OPERATION

Normally the netting would be made in a knotting step on the net-making machine and after passing over the mesh size rollers 30, would pass through the floor 31 into storage where it would remain until required.

But, according to the invention, instead of going to storage, the netting A passes through the floor opening 31a as usual, but then enters the tank 21 passing around the roller 22 beneath the level of the treating solution. Thence, it passes around the rollers 23 and 24, at which position the fume hood 33 removes the solvent, and, as an incident thereto, dries the netting.

The netting then passes around the draw roller 25 which is driven from the mesh size rollers 30 by means of the chain wheels 27 and 28 and the chain 29. The press or nip roller 26 keeps the netting in close contact with the draw roller 25. From there the finished netting goes to storage.

From the time it is woven in the knotting step, on the net-making machine, which is not shown, to the time it is dried and finished, the netting is held under continual tension between the mesh size rollers 30 and the draw roller 25. This keeps the knots tight until the impregnating material has set to hold them in shape.

By this treatment the netting becomes impregnated with a thin synthetic resin solution. The netting is kept under tension during the impregnation and afterwards until the synthetic resin has had time to set about and within the filaments sufficiently for it to hold the knots in shape and to prevent "slip-mesh." It should be understood that the netting must not be allowed to relax from the time the knots are made until the knots are set.

While the process is effective in setting the knots, the characteristics of the twine material are not heat modified, as they are for example when a heating process is used.

The impregnating resins which can be used according to the invention are those which are alcohol-soluble and which when deposited from solution are sufficiently film-forming to have enough strength to form a skeleton structure within the twine, thereby to retain the twine in the configuration of the knot. Any thermoplastic easily available resins which are alcohol-soluble are useful. Preferred impregnants are alcohol-soluble polyamides, acrylic resins, polyesters, vinyl copolymers, polyvinyl acetals, particularly polyvinyl butyral and cellulose acetate.

The amounts of the resin in solution should be from about .5% to about 3% by weight.

One impregnating solution is made from an alcohol-soluble form of nylon. One suitable form of this material is referred to as "F. M. 6501" in the catalogue, "Dupont Nylon Molding Powder," copyright 1948, Serial No. A-7257. Other types of nylon which are useful are known under the specifications of 6B and type 8. The alcohol-soluble resin is put into solution from .5 to 3% by weight, preferably about 1%, in methyl or isopropyl alcohol which preferably contains water up to about 20%. The amount of nylon in the solution is computed on the total liquid.

The resin may be dissolved by heating the alcohol to about 150° F. and agitating thoroughly.

The resin stays in the solution and, unlike solutions having a high concentration of resin, an anti-gelling constituent for example, furfural need not be added, but can be added if desired.

The temperature of the solution bath should be between about 70° F. and about 140° F. with the preferred range between about 105° F. and about 115° F. This temperature keeps the resin in a true solution and prevents colloidal aggregation. In the solvent recovery stage the temperature should be in the normal range from about sixty (60) ° F. to about one hundred (100) ° F.

The range of concentration is relatively critical. If the range is lowered it does not have the effect of causing the twine to hold its knot. If the solution concentration is increased, it becomes syrupy and one gets a coating instead of an impregnation.

As indicated, the netting must be kept under tension until impregnated and until the impregnation medium has time to dry sufficiently to hold the knots in shape.

The netting picks up approximately 100% of its own weight of the solution using a one percent (1%) solution. When dry, the netting has been found to have acquired an additional weight in the neighbourhood of from about one-tenth of one percent to about one and one-half percent, preferably about one percent. The fact that the treatment is an impregnation rather than a coating has been shown by including a small amount of a tracer dye in the solution. After the treatment, the dye appears throughout the twine.

Variation of the amount of resin within the limits stated may be employed to vary the hand of the netting. The higher the concentration of the resin in the solution, the harder the hand and vice versa.

The process is applicable to treating netting made from synthetic yarn of any size. It may run for example from yarn of about 140 denier 2 ply yarn of 210/30/3 or 210/100/3. In fact, the coarser the yarn the better since it picks up more of the impregnating solution.

The process may be applied to double or single knot netting although usually the double knot netting does not need treatment, so the preferred application is to netting made with single weaver's knots.

The process may be applied to netting made from polyamides, polyesters and partially acetylated cellulose derivatives. Nylon yarn or other yarns having similar characteristics, as for example, "Dacron," "Orlon," etc., are particularly applicable. So the process can be said to be applicable generally to synthetic linear condensation polymers.

The process is particularly applicable to single knotted fish netting wherein it is surprising that it is effective to secure the knots owing to the very thin solution employed. It is the applicants' belief that the nylon impregnation sets up within the interstices of the filaments a skeleton structural formation which is elastic but keeps the form of the knots.

The invention is also applicable to treating twines for mending netting.

In making this twine, a tube or package is first wound under winding tension. Then the package is immersed in the solution for about 5 to about 15 minutes. Then, it is dried for 48 hours. The twine is slightly stuck together which has the advantage of keeping the package together. Packages of one-half pound and one pound can be made up.

The solution may also be used by fishermen to mend their nets, by applying it by hand or in a bath to the netting, particularly at the knots.

Another advantage of the applicants' method is that heating the netting is not required. Not having to heat eliminates shrinkage of the nylon and thus mesh-size difficulties. Also, larger twines for example those above 210/3 are hard to heat-set because the outside of the twine fuses before the inside gets hot, unless a very slow treatment is given.

In the process the netting is preferably advanced through the impregnating bath at normal knotting speed of say about 5 to 6 meshes per minute. This results in an immersion time for each knot ranging from about 15 to about 45 seconds. This is usually sufficient to give the solution long enough to penetrate the twine. Drying time is preferably from about 2 to about 5 minutes during which the netting must be kept under tension.

During the process and when the ends are tied into the machine, a drop of the impregnation solution can be applied to each knot to prevent it from coming loose.

In order to demonstrate specific procedures according to the invention, the following examples are given by way of explanation:

Example I

A 210 denier 210/2/3 nylon twine (high tenacity bright, polyamide) after being woven into fish netting was the article treated.

The netting was immersed as described in the specification in 1¼ solution of resin at about 110° F.

The solution was type 16 nylon in isopropyl alcohol containing about 5% by weight of water. Each part of the netting was in the solution for about 20 seconds and was subsequently dried in air at about 70° F.

The netting evidenced that it was impregnated. It was characterised by absence of slip mesh and loose knots. The netting was stable indefinitely. The twine was not stretched any more than it would have been had there been no impregnation.

Example II

The procedure of Example I was repeated but the netting had a twine size of 210/30/3. The netting had substantially the characteristics of the netting of Example I.

Example III

The procedure of Example I was repeated with a twine of a size 210/2/3. In place of the nylon solution, a solution of polyvinyl butyral about 1% in methyl alcohol with no water was applied at room temperature. The netting had substantially the same characteristics as the netting described in Example I.

Example IV

The procedure of Example I was repeated with the exception that a solution of about 1½% of type 8 nylon was used in one instance with methyl alcohol in admixture with about 20% water and in another instance with isopropyl alcohol with 20% water. The results were substantially the same.

Example V

The procedure of Example I was repeated with the exception that the solution was of polyvinyl acetate. Results were similar.

In all these examples, the characteristics of the resulting netting were excellent. The twine of the netting was impregnated. It was characterized by absence of slip mesh and loose knots. The netting was stable in this condition.

This application is a continuation-in-part of U. S. Pat. app. S. N. 273,804, filed February 28, 1952, entitled "Slip-Free Fish Netting"—Needham et al.

We claim:

1. A method of making fish netting which comprises, forming on a netting machine netting from a twine of continuous filament high polymer synthetic resin by knotting with single knots, keeping such netting after knotting under a tension sufficient to maintain the knots tight, then continuing to keep the netting under tension after formation and impregnating it with a knot-retaining resin by advancing the netting while still under tension from the netting machine through an impregnating bath containing a thin alcohol solution of from about 0.5% to about 3% of an alcohol-soluble synthetic resin whereby the netting picks up the solution, separating the netting from excess resin solution by removing the netting from the impregnating bath while still keeping the netting under tension, and removing the solvent to leave a light deposit of synthetic resin impregnated in the twine and an imperceptible coating on the netting effective to maintain the knots tight against the normal tendency of the twine to undo the knots, all during the process keeping the temperature of the treatment insufficient to counteract the elastic memory of the twine by heat-setting.

2. A method of making fish netting from twine of a high polymer synthetic resin, comprising, continuously performing simultaneously on successive lengths of netting, a knotting step to form single knot netting and a setting step to counteract the elastic memory of the high polymer synthetic resin tending to produce slipping of the knots, performing the knotting step on a portion of a length of the netting while performing the setting step on a previously knotted portion of the length and keeping the entire length constantly under tension to keep the knots tight from the time of knotting until set, the setting step comprising passing the netting continuously through a thin solution of from about 0.5% to about 3% of a water-insoluble synthetic resin to cause the netting to pick up the solution, removing the netting from the solution to cause the netting to retain a light deposit of the resin and to reject excess which would produce a perceptible coating, then passing the netting while still maintaining the tension thereon through an evaporation zone at normal temperature for the removal of the solvent whereby there is produced a netting in which the knots are tight and the elastic memory of the twine material is effectively counteracted to prevent any substantial slipping of the knots, maintaining throughout the process a temperature insufficient to counteract the elastic memory of the twine by heat-setting.

References Cited in the file of this patent

UNITED STATES PATENTS

| | | |
|---|---|---|
| 1,727,096 | Bourn | Sept. 3, 1929 |
| 2,058,476 | Lovett | Oct. 27, 1936 |
| 2,536,312 | Saether | Jan. 2, 1951 |
| 2,590,586 | Thompson et al. | Mar. 25, 1952 |
| 2,590,642 | Nichols | Mar. 25, 1952 |
| 2,601,770 | Goldsmith | July 1, 1952 |
| 2,686,348 | Goldsmith | Aug. 17, 1954 |